Feb. 1, 1944.  H. H. BOUSCHOR  2,340,450
METHOD OF REPAIRING MACHINE TOOLS AND SLIDE CONSTRUCTION THEREFOR
Filed March 20, 1942
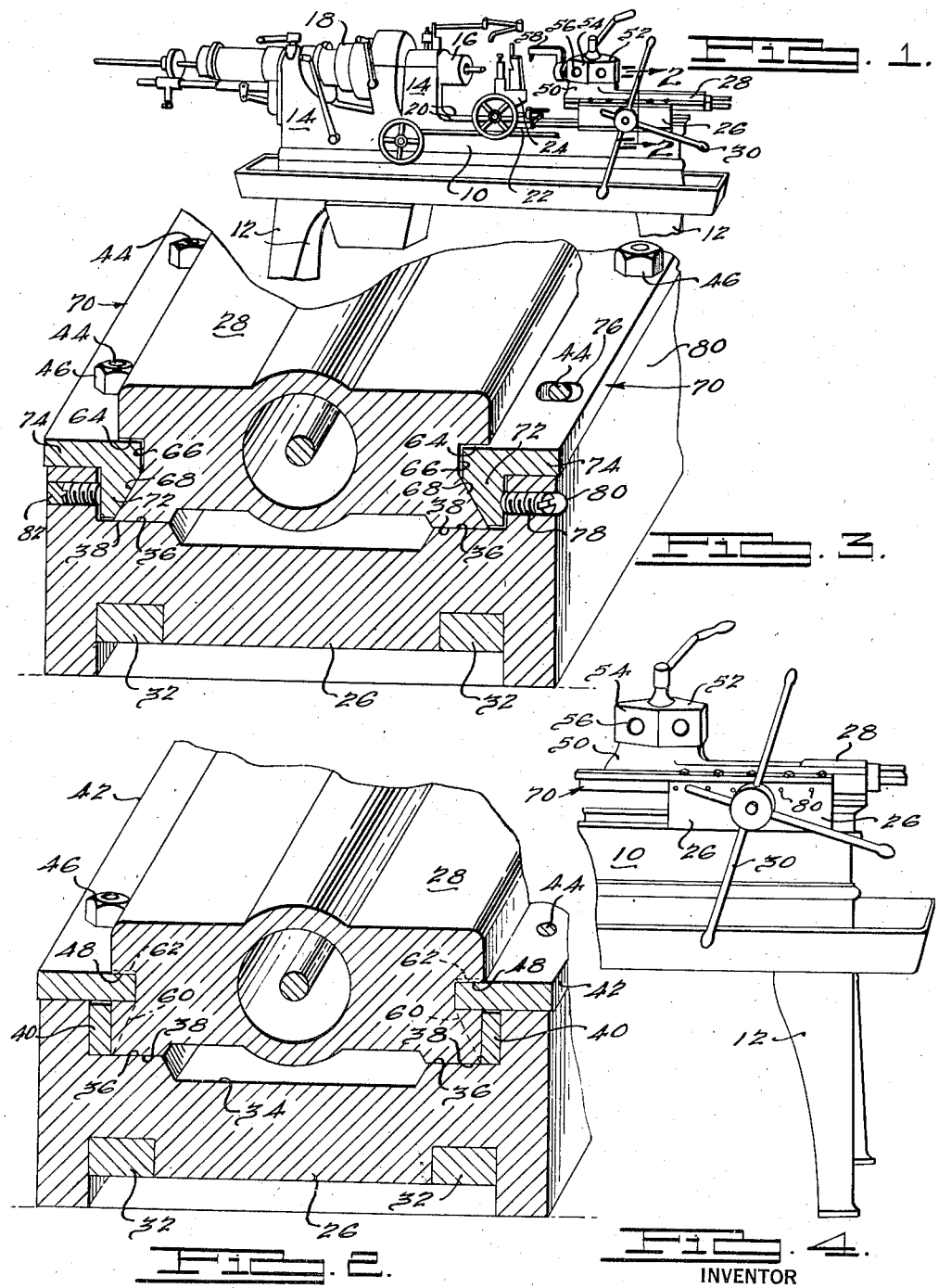
INVENTOR
*Harvey H. Bouschor.*
BY
*Harness, Dickey & Pierce*
ATTORNEYS.

Patented Feb. 1, 1944

2,340,450

UNITED STATES PATENT OFFICE 2,340,450

METHOD OF REPAIRING MACHINE TOOLS AND SLIDE CONSTRUCTION THEREFOR

Harvey H. Bouschor, Detroit, Mich.

Application March 20, 1942, Serial No. 435,502

4 Claims. (Cl. 29—148)

This invention relates to the repair, reconstruction or re-building of certain types of machine tools and particularly the saddle and slide or equivalent constructions thereof, the principal object being the provision of a method of repairing or reconstructing such saddle and slide constructions so that they will co-act with one another in an accurate manner and will remain operative for a longer period of time and will withstand the effects of wear better than in the original machine, together with a form of construction resulting from such repair or reconstruction.

Objects of the invention include the provision of a method of repairing a machine tool having a pair of parts one slidably supported by the other and in which movement of one of the parts transversely of the direction of movement between it and the other of said parts is intended to be prevented by means of contacting surfaces on the two parts and by means of plates secured to one of the parts and received in rectangularly sectioned grooves in the other of said parts together with a gib arranged between the two parts adjacent each of the plates, comprising machining that part having the rectangularly sectioned grooves therein to change such grooves into angular or V-like conformation, and replacing each plate and its cooperating gib by an angularly sectioned member receivable in the cooperating of said re-machined grooves; the provision of a method of repairing machine tools as above described in which means are provided for adjusting the angularly sectioned guide member laterally with respect to the direction of movement between the relatively movable parts; the provision, in a method of repairing or re-building a machine tool as above described, of the step of plugging the adjusting screws on one side of the parts to prevent access thereto by the usual operator of the machine; and the provision, in a method of repairing or re-building a machine tool as above described, of the step of providing such angular guide members of greater length than the length of that part in which the other of said parts is slidably mounted.

Further objects of the invention include the provision of a machine tool including a pair of parts one mounted for relative sliding movement upon the other, said one part being provided with angularly sectioned grooves in opposed sides thereof and an angularly sectioned guide bar being fixed to each side of such other part and being engaged within each said angularly sectioned groove, a plurality of screws being provided between each of said guide means and such other part in spaced relation over the length of the latter to permit accurate adjustment of the guide part laterally of the direction of movement of said one part in such other part, and additional means being provided for rigidly locking said guides in laterally adjusted position; and the provision of a construction as above described in which the guides project longitudinally beyond the end of such other parts to furnish an additional support for said one part when projected beyond the other part.

The above being among the objects of the present invention the same consists in certain steps or combinations of steps of operation and certain novel features of construction and combinations of parts to be hereinafter described with reference to the accompanying drawing, and then claimed, having the above and other objects in view.

In the accompanying drawing which illustrates a form of machine tool to which the present invention is applicable both in its original and its repaired or re-built condition, Fig. 1 is a fragmentary perspective view of a turret lathe or screw machine of the type to which the present invention is generally applicable;

Fig. 2 is a fragmentary, perspective sectional view illustrating the saddle and slide construction of the machine shown in Fig. 1 in the form originally furnished by the manufacturer, taken as on the line 2—2 thereof;

Fig. 3 is a view similar to Fig. 2 but illustrating the saddle and slide construction after the same has been repaired or re-built in accordance with the present invention; and, Fig. 4 is a fragmentary, perspective view of a portion of the machine shown in Fig. 1 illustrating the extension of the guiding elements provided in accordance with the present invention for the purpose of giving additional support to the overhanging end of the slide.

The present invention is generally applicable to machine tools having one part slidably supported by another part. It is particularly applicable for use in connection with a saddle and slide or ram construction of a number of turret lathes or screw machines that are now, and have for a substantial number of years, been produced in quantities, and for that reason such a screw machine is employed by way of illustration in order to explain the present invention, its application to other types and constructions of machine tools thereby being made apparent to those skilled in the art.

Referring particularly to Fig. 1, the turret lathe or screw machine there shown includes a bed 10 supported from the floor by suitable legs 12. At one end the bed 10 is provided with a pair of bearing supports or standards 14 formed integrally therewith projecting upwardly therefrom and these rotatably support a spindle (not shown) on the forward end of which a suitable chuck 16 is suitably secured. The particular chuck shown is a collet chuck although it will be appreciated that any suitable type of chuck may be employed to correspond to the character of the particular work to be operated upon. The particular type of machine shown is belt driven, and, accordingly, a belt cone 18 is supported on the spindle between the supports 14 in a conventional manner. The upper surface of the bed to the right of the forward supports 14 as shown in Fig. 1 is provided with a pair of conventional ways 20 upon which a carriage 22 is mounted for slidable movement toward and from the chuck 16 and carries a cross-slide 24 which is adapted to carry suitable tools for performing certain operations on the work supported in the chuck 16. On the rear or righthand end of the ways 20 a saddle 26 is slidably supported for movement toward and from the chuck 16. This is the particular part of the mechanism to which the present invention is particularly adaptable. As illustrated in Figs. 1 and 2 the saddle 26 slidably supports a slide or ram 28 thereon for movement toward and from the chuck 16 and such movement of the slide or ram 28 on the saddle 26 is controlled in a conventional manner by means of a handwheel 30. Suitable means (not shown) are provided for locking the saddle 26 in slidably adjusted position on the ways 20.

The construction of the saddle 26 and slide or ram 28 illustrated in Figs. 1 and 2 is conventional and as illustrated best in Fig. 2 the saddle 26 is of cast construction and generally of H-section, the lower portions of the legs of the H straddling and engaging the sides of the ways 20 and the cross-bar of the H resting against the upper faces of the ways 20. For the purpose of resisting wear at this point wear bars 32 are set into the cross-bar of the H for contact with the upper face of the ways 20. The upper face of the bare of the H is centrally relieved as at 34 to provide a pair of longitudinally extending laterally spaced way surfaces 36 on either side thereof. The ram 28 which is of generally rectangular section over the greater part of its length is provided along the outer margins of its lower surfaces with complementary surfaces 38 which contact the way surfaces 36 and, therefore, serve to support the weight of the ram or slide 28 on the saddle 26.

The slide or ram 28 is, as indicated in Fig. 2, of less width than the spacing of the legs of the H of the saddle 26 and interposed between the inner face of each leg of the H of the saddle above the bar thereof and the opposed side face of the ram or slide 28 is a gib 40, these gibs serving to take up side play between the saddle and the slide or ram. The gibs 40 are conventionally tapered in the direction of their length so that by shifting one or the other longitudinally the lateral clearance of the ram 28 in the saddle 26 may be increased or decreased. The gibs 40 thus afford a means for taking up the wear occurring between the sides of the ram and the saddle 26. The gibs 40 may both taper in the same direction or the taper of one may be reversed from the other, both arrangements being conventionally employed. Conventional means are provided for adjusting the gibs 40 longitudinally of the saddle 26 and for locking them in adjusted position.

In order to maintain the surfaces 36 and 38 in contact with each other and thus prevent the ram or slide 28 from tipping under the stress of a cutting operation, a saddle plate 42 is secured by bolts such as 44 and nuts 46 to the upper edge of each leg of the H of the saddle 26. These saddle plates 42 are of rectangular section and project inwardly beyond the corresponding gib 40 and are closely received in rectangularly sectioned grooves 48 formed in the side faces of the ram or slide 28.

The forward or lefthand end of the slide or ram 28 as illustrated in Figs. 1 and 4 is increased in height as at 50 and provided with a flat top face upon which a turret 52 is rotatably mounted, the turret 52 having a plurality of side faces 54 each centrally provided with a tool receiving opening 56 therein in each of which a tool may be removably received. One form of external turning tool is indicated at 58 in Fig. 1 as being supported in one of these openings.

In turret lathes or screw machines of the type shown and above described tools other than axially operating tools such as drills, reamers, or the like which are carried by the turret 52 are arranged to contact the work either along the upper or the lower surface thereof, this being for the reason that in such position it will not interfere with cutting tools carried by the cross-slide 24 and which may be simultaneously operating upon the piece of work. For this reason such tools carried by the turret 52 will tend to raise the front end of the ram or slide 28 during a cutting operation if engaging the top of the work, and depress it if engaging the bottom of the work. In actual practice the ram or slide 28 is projected toward the work to such a distance that the turret 52 often projects wholly beyond the end of the saddle 26 and thus a relatively great overhang is created between the point of contact of the tool with the work and the front edge of the saddle 26. As a result, a slight amount of wear between the surfaces 36 and 38 and between the saddle plate 48 and the ram or slide 28 will be multiplied at the point of contact of the tool with the work and where the tool is engaging the upper or lower surfaces will permit an amount of movement thereof in a vertical direction which makes it impossible to hold the dimensions of the work being established by the tool within accurately predetermined limits. It will be appreciated that with the construction shown in Fig. 2 any wear occurring between the surfaces referred to cannot be taken up by any adjustment as no adjustment for this purpose is provided and in such case where the wear becomes excessive it is necessary to re-machine these surfaces and re-locate them to cure the evil.

In the construction illustrated in Fig. 2 any wear occurring between the sides of the ram or slide 28 and the saddle 26 can, of course, be taken up by adjustment of the gibs 40, but it will be appreciated by those skilled in the art that in taking up such lateral wear by means of the gibs 40 unless both gibs are taken up equally the ram or slide 28 may be shifted to one side or the other whereas it is of extreme importance, particularly where a tool carried by the turret 52 is a drill or other boring tool, that the axis of the tool be maintained in exact concentricity with the axis of the lathe or screw machine spindle. Experience has shown that the operators of such machines while skilled in the operation of the machine itself, are ordinarily not skilled in the construction and adjustment of the machine and often attempt to take up such side wear between the ram and the saddle themselves, and in doing this usually take up on one gib only with the result that the saddle 28 is shifted laterally by the adjustment which thus throws the centerline of the turret 52 out of alignment with the spindle, thereafter resulting in inaccurate work.

Where wear occurs between the surfaces 36 and 38 and between the saddle plate 42 and the grooves 48, the recommended procedure in taking up such wear is to disassemble the assembly and remove metal from the upper edges of the saddle 26 along those surfaces thereof on which the saddle plates 42 are received. Usually in such case, if it is to be a workmanlike job, the surfaces 36 and 38 must be re-scraped, the grooves 48 must be re-machined to square them up and then be re-scraped, and the upper faces of the saddle 26 which receive the saddle plates 42 must be machined and scraped until the desirably small clearance is established between the worn surfaces. This operation is a long, tedious and expensive job and because of the character of these surfaces and the inability to adjust them to take up vertical wear without going through the procedure above described, the necessity of repeating such procedures at frequent intervals will be apparent. It is in connection with eliminating the disadvantages of this feature of the construction described that the present invention deals.

In accordance with the present invention when the above described wear develops between the saddle 26 and the ram or slide 28 to an extent requiring repair, instead of repairing the same in accordance with conventional practice as above described, the following procedure is carried out. The grooves 48 in the sides of the ram or slide 28 are re-machined to form them into grooves of angular cross-sectional configuration and preferably so that such grooves now have a horizontal upper wall and a lower wall flared outwardly and downwardly. While such angular grooves thus machined in the sides of the ram or slide 28 may, of course, vary considerably in size and cross-sectional configuration, it has been found most convenient to machine away each side of the ram or slide 28 from the lower inner corner of each groove 48 to the lower outer corner of the slide on the corresponding side thereof as along the dotted lines 60 shown in Fig. 2, and to machine away the upper wall of each groove 48 in parallelism with the original plane thereof as indicated by the dotted line 62 in Fig. 2. The new grooves thus formed are illustrated in Fig. 3 from which it will be seen that each is now provided with a horizontal upper wall 64, a short vertically directed inner wall 66, and an outwardly flared angular bottom wall 68.

The saddle plates 42 and the gibs 40 are discarded and in the place of each saddle plate 42 and its associated gib 40 is substituted a part which I prefer to term a way bar 70. Each way bar 70 includes a head portion 72 substantially complementary in size, shape and contour to the new grooves thus machined in the corresponding side of the ram or slide 28, and an integrally formed outwardly projecting plate-like portion 74 which overlies the upper ends of the legs of the H of the saddle 26 in the same manner that the saddle plates 42 formerly were arranged. The head 72 of each way bar 70 is such that its angular face contacts the angular face 68 of the corresponding groove in the ram or slide 28 with those faces thereof complementary to the surfaces 64 and 66 of the grooves spaced from such faces so as to provide clearance between them.

The same bolts 44 and nuts 46 originally employed to clamp the saddle plates 42 to the saddle 26 may be employed for clamping the way bar 70 down onto the saddle 26, but in this case the holes 76 in the plate portion 74 of each way bar 70 through which the bolts 44 project are elongated transversely of the length of the way bar 70 as illustrated in Fig. 3 so as to permit the way bar 70 to be adjusted inwardly and outwardly. In this respect it will be noted and as clearly brought out in Fig. 3 that preferably the lower outer wall of the head 72 of each way bar 70 is provided with clearance between it and the opposed face of the saddle 26. Adjusting screws 78 are threaded through openings 80 drilled through the upper portions of the legs of the saddle 26 in perpendicular relationship with respect to the outer side faces thereof and bear against the lower outer face of the head 72 as illustrated in Fig. 3 so as to enable the way bars 72 to be adjusted transversely of their length when the nuts 46 are loosened on the bolts 44. A sufficient number of these screws 78 are provided along each side of the saddle 26 to prevent any possibility of the way bars 70 springing outwardly between them, this being necessary if uniform clearance throughout is to be obtained.

It will be appreciated that in this re-constructing of the saddle 26 and slide or ram 28 the surfaces 36 and 38 thereof are re-machined and re-scraped and the bearing surfaces between each way bar 70 and the ram or slide 28 are accurately scraped into place. The screws 78 are then adjusted while the nuts 46 have been loosened so as to bring the path of movement of the ram or slide 28 as determined thereby into exact parallelism with the axis of the lathe or screw machine spindle and to align the holes 56 in the turret 52 as much as possible with the axis of the lathe or screw machine spindle, and then the way bars 70 are locked in place. The holes 56 in the turret 52 are then re-bored by means of a tool suitably supported by the spindle of the lathe or screw machine and are then re-bushed to the proper size, thereby positively aligning the re-bushed holes 56 with the axis of the lathe or screw machine turret.

In order to prevent the machine operator from attempting to make an adjustment of the way bar 70 himself and thus possibly destroy the parallelism of movement of the ram or slide 28 with the axis of the spindle of the lathe or screw machine without detection, it is preferred, and as illustrated in Fig. 3, that the screws 78, at least on one side of the saddle 26, be made shorter than the holes 80 in which they are received and, after the proper adjustments of the way bars 70 have been made by those re-building this part of the machine, to plug the outer ends of the holes as at 82 on one side only of the saddle 26 with a mass of suitable material such as lead, sealing wax, or the like. Under such circumstances the machine operator cannot adjust the way bar 70 on that side of the saddle 26 on which the holes 80 are plugged without escaping detection, but may adjust the way bar 70 on the opposite side of the saddle to take up any wear that might develop between the saddle and the slide or ram. Such adjustment on the part of the machine operator cannot, however, disturb the parallelism of movement of the slide or ram with respect to the lathe or screw machine spindle as the undisturbed way bar will continue to maintain such parallelism. Should sufficient wear develop that adjustment of one way bar 70 only will displace the slide or ram 28 laterally of the saddle 26 to an undesirable degree, then a skilled machine repairman may remove the plugs 82 and re-adjust the machine to accurately centralize the slide or ram 28 with respect to the spindle of the lathe or screw machine and then re-plug the holes to provide unauthorized tamping with such readjustment.

It will be appreciated that in thus re-constructing the saddle 26 and ram or slide 28 any wear which develops between the surfaces 36 and 38 and between the surfaces 68 and the opposed faces of the way bar 70 which would permit any vertical movement of the ram or slide 28 with respect to the saddle 26 under the conditions first mentioned in connection with the conventional construction, may be quickly and accurately taken up by simply loosening the nuts 46 on that side of the saddle 26 where the screws 78 are accessible, and threading such screws inwardly to effect a corresponding movement of the corresponding way bar 70 until all of such vertical movement is eliminated, upon which the nuts 46 may again be tightened up to lock such way bar in its newly adjusted position. It will be appreciated that such movement of the way bar not only serves to take up any vertical wear that may have occurred between the surfaces mentioned but also simultaneously serves to take up any wear which has developed between the surface 68 of each groove in the slide or ram 28 and the opposed surface of the way bar 70, so that in this case the way bars 70 not only serve the same purpose as the gibs 40 of the original construction in taking up lateral wear between the saddle and the ram but additionally serve to take up any vertical wear which was impossible in the original construction by any adjustment of parts but only by re-machining those surfaces of the structure through which such vertical movement was controlled.

Because of the rigidity of the way bars 70 it is possible to utilize them in a further manner not possible in the original construction. This is in connection with providing an additional support for the overhanging turret end of the slide or ram 28 when the latter is in its forwardmost position and under which circumstances undesirable vertical give of the forward end of the ram or slide and the tools supported thereby is liable to develop even under minimum amounts of vertical clearance between the saddle and the slide or ram. In accordance with this phase of the invention the way bars 70 are made of greater length than the saddle 26 and in applying them to the saddle 26 such excess length may be projected at the forward end of the saddle 26, as illustrated in Fig. 4, so that when the forward end of the slide or ram 28 is projected beyond the end of the corresponding end of the saddle 26 the way bars 70 will still remain in supporting relation with respect to the projecting end of the ram or slide and thereby provide additional support therefor tending to maintain it against a tendency toward vertical give.

The holes 76 for the bolts 44 may be extended over the full length of the way bars 70 and inasmuch as such holes are equally spaced throughout, should the forwardly projecting ends of the way bars 70 interfere with the cross-slide 24 or any tools carried thereby in machining any particular part, they may be simply shifted rearwardly on the saddle 26 the required amount, or a sufficient length of their forwardly projecting ends be simply sawed off to meet the particular condition. In any case it will be appreciated that by projecting the forward ends of the way bars 70 beyond the forward end of the saddle 26 as far as possible under any particular condition of operation, a material steadying effect on the forward end of the slide or ram 28 is obtained which permits more accuracy of machining to be obtained and heavier cuts to be employed.

It will be appreciated that the construction thus resulting from re-building the saddle and slide construction of the original machine shown and described is capable of being applied to such turret lathes or screw machines or to similar machine tools in the original manufacture with all of the attendant advantages above discussed, and it is, therefore, to be understood that the invention is not entirely limited to its application in the repairing or re-building of such machine tools but is also applicable to new equipment.

Having thus described my invention, what I claim by Letters Patent is:

1. In the re-building of a machine tool of the class including a saddle and a slide having spaced cooperating pairs of coplanar way surfaces, gibs for taking up lateral wear between the saddle and the slide, a groove in each side of the slide with side walls parallel to the plane of said way surfaces and plates fixed to the saddle engaged in the grooves, the steps of removing the plates and the gibs, re-machining the grooves to remove at least a portion of the metal forming the lower wall of each thereof and thereby forming a downwardly and outwardly flared wall portion, and positioning a way bar between said saddle and said slide in place of each of said plates and its cooperating gibs with one face of said way bar in complementary engagement with respect to said flared wall of said groove and having clearance between its upper face and the upper wall of said groove and with a portion of said way bar overlying an upper surface of the saddle, threading adjusting screws through a side of said saddle and into engagement with said way bar to force said way bar into engagement with said slide, and projecting screw means through said portion of said way bar at an angle to said adjusting screws and into said saddle for locking said way bar in the position determined by said adjusting screws.

2. In the re-building of a machine tool of the class including a saddle and a slide having spaced cooperating pairs of coplanar way surfaces, gibs for taking up lateral wear between the saddle and the slide, a groove in each side of the slide with side walls parallel to the plane of said way surfaces and plates fixed to the saddle engaged in the grooves, the steps of removing the plates and the gibs, re-machining the grooves to remove at least a portion of the metal forming the lower wall of each thereof and thereby forming a downwardly and outwardly flared wall portion, and positioning a way bar between said saddle and said slide in place of each of said plates and its cooperating gibs with one face of said way bar in complementary engagement with respect to said flared wall of said groove and having clearance between its upper face and the upper wall of said groove and with a portion of said way bar overlying an upper surface of the saddle, projecting a plurality of screws through each side of said saddle and into engaging relation with respect to said way bars to laterally position the said way bars with respect to said saddle, and releasably clamping said way bars in the adjusted position determined by said screws.

3. In the re-building of a machine tool of the class including a saddle and a slide having spaced cooperating pairs of coplanar way surfaces, gibs for taking up lateral wear between the saddle and the slide, a groove in each side of the slide with side walls parallel to the plane of said way surfaces and plates fixed to the saddle engaged in the grooves, the steps of removing the plates and the gibs, machining away each side of said slide from the inner lower corner of each of said grooves to approximately the lower edge of the corresponding side of said ram to thus provide an outwardly flaring wall at each side of the slide, replacing each said plate and its corresponding gib with a one-piece member including a head portion approximately corresponding in size, shape and contour with the re-machined groove in each side of said slide and the space formerly occupied by the inner edge of the corresponding saddle plate and the cooperating gib with one face thereof in engagement with the outwardly flared wall thus provided in the re-machined groove and having clearance with the remaining walls of the corresponding grooves, projecting a plurality of screws through the corresponding sides of said saddle and into contact with the corresponding of said way bars for effecting transverse adjustment thereof, and locking said way bars against relative vertical movement with respect to said saddle and in laterally adjusted position by applying releasable holding means between said saddle and said way bars.

4. In the re-building of a machine tool of the class including a saddle and a slide having spaced cooperating pairs of coplanar way surfaces, gibs for taking up lateral wear between the saddle and the slide, a groove in each side of the slide with side walls parallel to the plane of said way surfaces and plates fixed to the saddle engaged in the grooves, the steps of removing the plates and the gibs, re-machining the grooves to remove at least a portion of the metal forming the lower wall of each thereof into a downwardly and outwardly flared wall portion, and positioning a way bar in place of each of said plates and its cooperating gibs with one face of said way bar of greater length than the length of said saddle in complementary engagement with respect to said flared wall of said groove and with a portion of said way bar overlying an upper surface of the saddle and with the excess length of said way bars projecting beyond the forward end of said saddle, threading adjusting screws through a side of said saddle and into engagement with said way bar to force said way bar into engagement with said slide, and projecting screw means through said portion of said way bar at an angle to said adjusting screws and into said saddle for locking said way bar in the position determined by said adjusting screws.

HARVEY H. BOUSCHOR.